United States Patent [19]
> Elsbett

[11] 3,845,746
[45] Nov. 5, 1974

[54] METHOD OF AND ARRANGEMENT FOR CONTROLLING THE SWIRLING AIR LAYERS IN THE CYLINDERS AND COMBUSTION CHAMBERS OF AN AIR-COMPRESSING MULTI-CYLINDER RECIPROCABLE PISTON INTERNAL COMBUSTION ENGINE

[76] Inventor: Ludwig Elsbett, Industriestrasse 14, 8551 Hilpoltstein, Germany

[22] Filed: Dec. 9, 1971

[21] Appl. No.: 206,373

[30] Foreign Application Priority Data
Dec. 12, 1970  Germany............................ 2060740

[52] U.S. Cl. ......... 123/30 C, 123/30 D, 123/32 ST, 123/52 M, 123/52 MB
[51] Int. Cl. ......................... F02b 19/10, F02b 3/00
[58] Field of Search ....... 123/59 BM, 52 M, 52 MB, 123/32 ST, 30 C, 30 D

[56] References Cited
UNITED STATES PATENTS
2,318,714    5/1943    Anderson.......................... 123/30 C
3,125,075    3/1964    Wittek .............................. 123/30 C
3,146,764    9/1964    Elsbett ............................. 123/52 B
3,298,332    1/1967    Elsbett.............................. 123/30 C Primary Examiner—Laurence M. Goodridge
Assistant Examiner—Ronald B. Cox
Attorney, Agent, or Firm—Walter Becker

[57]                ABSTRACT

Method of and arrangement for controlling the swirling air layers in the cylinder and combustion chamber of an air compressing multi-cylinder reciprocating piston internal combustion engine, according to which an increased pressure differential is built up before the end of the suction stroke by the positive pressure produced in the induction system, and where necessary, by a suitable design of the exhaust system between the inlet and exhaust passages, the exhaust valve being opened once more during the suction stroke on this pressure differential developing to be closed only together with the inlet valve.

10 Claims, 5 Drawing Figures

METHOD OF AND ARRANGEMENT FOR CONTROLLING THE SWIRLING AIR LAYERS IN THE CYLINDERS AND COMBUSTION CHAMBERS OF AN AIR-COMPRESSING MULTI-CYLINDER RECIPROCABLE PISTON INTERNAL COMBUSTION ENGINE

This invention relates to a method of controlling the swirling air layers in the cylinder and the cumbustion chamber of an air-compressing multi-cylinder reciprocating piston internal combustion engine, in which each piston has a combustion chamber in the shape of a body of revolution while each inlet valve has associated therewith an inlet means adapted to impose a swirling motion onto the intake air in the cylinder. More specifically, the present invention relates to a method of the above type, according to which the effect of the momentum of the intake air, obtainable by connecting two or more swirl inducing means that do not overlap during their induction periods to a common intake pipe, is used in order to achieve a high speed air swirl and the maximum volumetric degree of filling of the cylinders during a short inlet opening period. The intake or suction system is so porportioned that the pressure in the induction system, which is negative during the suction stroke due to the inertia of the air, rises above the zero line already prior to the end of the suction stroke to act as a positive pressure on the cylinder. The inlet opening takes place only when the pressure in the cylinder substantially equals the pressure in the intake pipe associated with the respective cylinder.

An internal combustion engine of this kind has been described in British Pat. No. 1,039,402. In order to achieve the desired inertia effect, it is essential that only the inlet passages of those cylinders whose suction strokes do not overlap are joined to a common intake pipe. The high speed air swirl or air twist is obtained automatically due to the fact that this causes a larger flow of air to pass through the swirl-inducing port in a shorter time. This high-speed air swirl is important for efficient combustion to be achieved especially in engines employing the method of wall deposition of the fuel because this method relies entirely on the swirling motion of the air for the removal of the fuel from the cumbustion chamber wall and the subsequent preparation of the air/fuel mixture. Furthermore, a high-speed air swirl is necessary for the formation of an intimate air/fuel mixture where fuel injection is effected by only one jet.

In the induction system above referred to, the intake pipe which is common for each group of two or more cylinders is so proportioned and the admission is so timed that the air column in the induction system during the induction period is initially accelerated and moved respectively, almost exclusively, by the piston movement so that later on only the pressure due to the momentum of the moving column of air and no reflection pressure waves become effective.

The underlying principle of this arrangement resides in the fact that in the course of the suction stroke of the piston the column of air is accelerated as the speed of the piston increases. Thus, the energy expended in accelerating the air column is derived from the piston. Once the piston has passed the point of its maximum speed and decelerates, the process is reversed with the moving column of air returning the energy absorbed to the piston in the form of pressure due to the momentum of the air. At the same time, the intended improvement of the volumetric efficiency is achieved by the ram effect on the piston, i.e. by the air accumulated in this way by the piston.

The shifting of the inlet opening towards the top dead center when pressure balance exists between the cylinder and the induction system is intended to further assist in controlling and preventing undesirable reflections and pulsations.

The arrangement set forth in the German Offenlegungsschrift No. 1,576,014 offers yet another substantial advantage in conjunction with spherical combustion chambers. This is because, due to the piston motion, the induction air has imparted thereupon a swirling motion which, in spite of the differing diameters of the combustion chamber, results in almost the same angular velocities in the individual air layers, whereby a further requirement for a controlled combustion process is met.

Internal combustion engines employing the above-described principle have proved very satisfactory in practice. This fact naturally has led to efforts being made to achieve a further increase in output and improved performance with a view to eliminating any existing drawbacks.

It is, therefore, the object of the present invention to control the swirling air motion necessary in the cylinder for efficient and controlled combustion to the effect that, especially towards the end of the suction stroke, this air motion will not gradually slow down, as was the case heretofore, but for part load and full operation of the engine there is imparted once more an additional acceleration in order to step up the air swirl in the cylinder and, consequently, at all levels of the combustion chamber, the air being to effect this without disturbing the swirl pattern produced by the piston motion, especially in spherical combustion chambers, where the inducted air moves at almost the same angular velocity at all levels of the combustion chamber.

In contrast thereto, it is intended according to a further object of the invention to minimize or present any swirling and excessive air in the cylinder during idling of the engine.

It is also an object of this invention to minimize or eliminate any existing hitherto unavoidable sources of disturbances of the air swirl because this is necessary for stepping up the air swirl.

These and other objects and advantages of the invention will appear more clearly from the following specification in connection with the accompanying drawings, in which.

Figure 1:
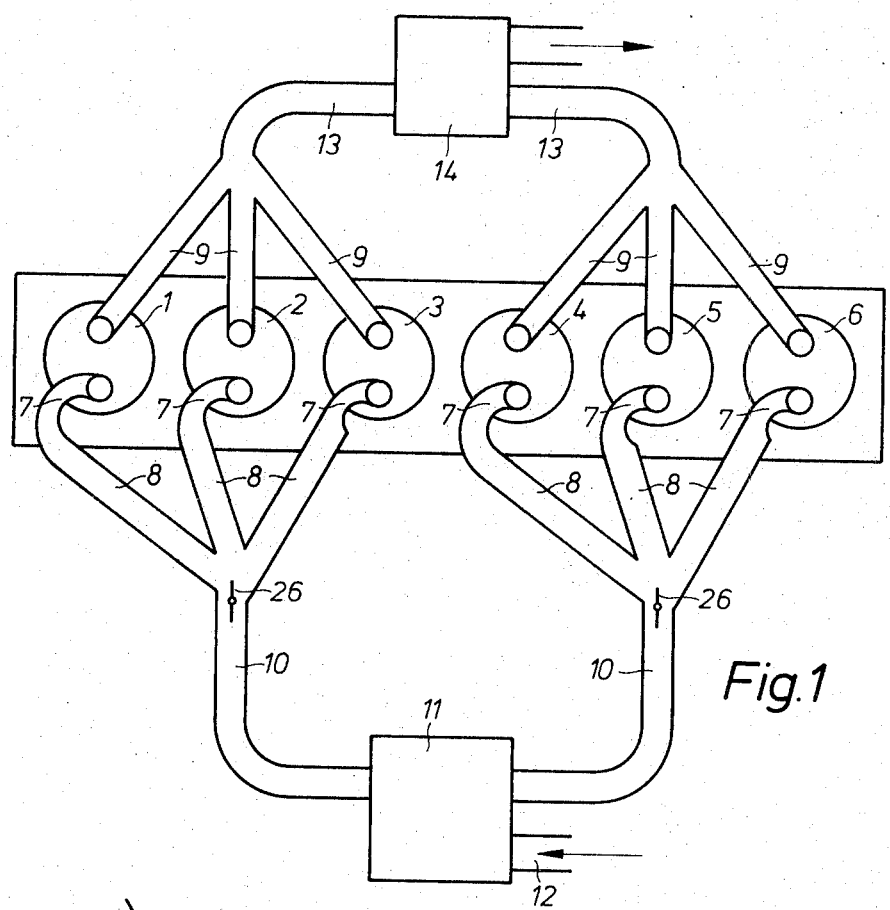
FIG. 1 is a schematic representation of a six-cylinder engine with one inlet opening and one exhaust opening according to the invention.

According to the invention, the above objects have been realized by building up an increased pressure differential before the end of the suction stroke by means of the positive pressure produced in the induction system and, if necessary, by a suitable design of the exhaust system between the inlet and exhaust passages, and by opening the exhaust valve once more as this pressure differential is being produced during the suction stroke and closing it only together with the inlet valve. In other words, the invention utilizes the effects of the momentum of the air during a valve overlap at the end of the suction stroke.

In the first instance, this makes it possible to maintain the swirl pattern in the combustion chamber so as to match the adopted combustion chamber shape while preventing swirl from tapering off at the end of the induction period where, instead, cut-off is abrupt with high-speed swirl persisting commensurate with the truncated-sphere shape of the combustion chamber. The main purpose of the invention is, however, seen in the fact that a scavenging action takes place at the end of the suction stroke while both the inlet valve and the exhaust valve are open. This has the substantial effect on the air swirl inasmuch as the air admitted to the cylinder at a high rotative speed causes the swirling motion of the air already contained in the cylinder to be stepped up once more vigorously and is again discharged through the exhaust passage without any stoppage. In this manner, air utilization is improved and, furthermore, an increase in the filling weight is obtained as a result of the cooling effect accompanying the additional air throughput. This cooling effect has a favorable influence on the engine components that are subject to high thermal stresses.

The pressure differential between the inlet and exhaust passages at the end of the suction stroke can be further increased by also joining groups of two or more exhaust passages of mutually interacting cylinders in a known manner to a common exhaust pipe with a downstream connected equalizing chamber. Interaction of the cylinders in this arrangement is brought about by an ejector action taking place in the exhaust system. Preferably, the exhaust passages of groups of three cylinders which have a firing interval of 240° crank angle are brought together, the common exhaust pipe being so proportioned that during the period in which one exhaust valve is open together with an inlet valve belonging to the same cylinder, a negative pressure is produced in the exhaust system and that during this period no reflections or gas pressure pulsations from another cylinder affect this negative pressure.

Such an additional feature produces a greater pressure differential between the induction and exhaust systems and a pressure drop is created at the exhaust whereby a marked increase in the air throughput is obtained during the valve overlap. It should be noted that utilization of the inertia effect of the exhaust gases by joining groups of two exhaust passages to one exhaust pipe is already known from the Austrian Pat. Specification No. 270,302, but using different timings and applied to different conditions.

As regards the length of each common intake pipe, it is proposed according to the invention so to proportion this that the entire accelerated air mass assumes a positive pressure at the time the exhaust valve is reopened also at maximum speed. There will thus result a diameter-to-length ratio of the intake pipe of approximately from 1:8 to 1:10.

As a further feature of the invention intended to prevent disturbance of the swirling motion of the air in the cylinder, the closure of the exhaust valve is advanced to a point before top dead center or, more exactly, before scavenging top dead center, so that all valves are closed at top dead center, eliminating the need for valve recesses that are liable to reduce air swirl.

The high-speed air swirl that can be produced on the basis of the aforementioned considerations and which is moreover obtainable without any great expense but, essentially, by a well devised timing of the valves and affords a substantial technical progress during part load and full load operation of an engine, has, however, a most disadvantageous effect in the idling range of the engine as is generally known. It is therefore not to be looked upon as an inconsistency if the invention also covers appropriate measures which permit efficient working of the engine according to the invention in the idling range.

During idling of the engine, only about one-tenth of the fuel has to be burned which does not necessitate an efficient mixing process.

It is essential, however, to prevent the high air flow rates and high swirl speeds from cooling the cylinders and the pistons excessively, which is liable to cause the well known blue smoke formation.

With a view to overcoming this problem, it is finally proposed according to the invention to incorporate throttling means in the induction system in a known manner, which, during the idling of the engine, admit only that amount of fresh air which is necessary for combustion into the cylinder while simultaneously spoiling the swirl to some extent, an incidental feature being that, during the valve overlap at the end of the suction stroke, there is a swirlfree reflux of exhaust gases into the cylinder.

Referring now to the drawings in detail and FIG. 1 thereof in particular, the numerals 1, 2, 3, 4, 5 and 6 designate the cylinders of a four-stroke reciprocating-type internal combustion engine. Each of the aforementioned cylinders is provided with a swirl port 7 with a corresponding manifold branch 8, producing a swirling motion of the air, and an exhaust manifold branch 9. Each group of three branches 8, whose cylinders have a firing interval of 240° crank angle, is joined to a common intake pipe 10, whose diameter-to-length ratio is approximately between 1:8 and 1:10. The intake pipes 10 communicate with a pressure equalizing chamber 11 which, in the case illustrated, is common to all intake pipes 10. From the pressure equalizing chamber 11, a pipe 12 leads to an air cleaner 12a.

The layout of the exhaust system is similar to that of the above described induction system. Each group of three exhaust manifold branches 9 is joined to a common exhaust pipe 13. All exhaust pipes 13 of the engine terminate in a common pressure equalizing chamber 14 from which the gases are discharged to atmosphere or to suitable apparatus for further use. Special mentioned is made of the fact that, if desired, each of the exhaust pipes 13 may have its own pressure equalizing chamber.

Figure 2:
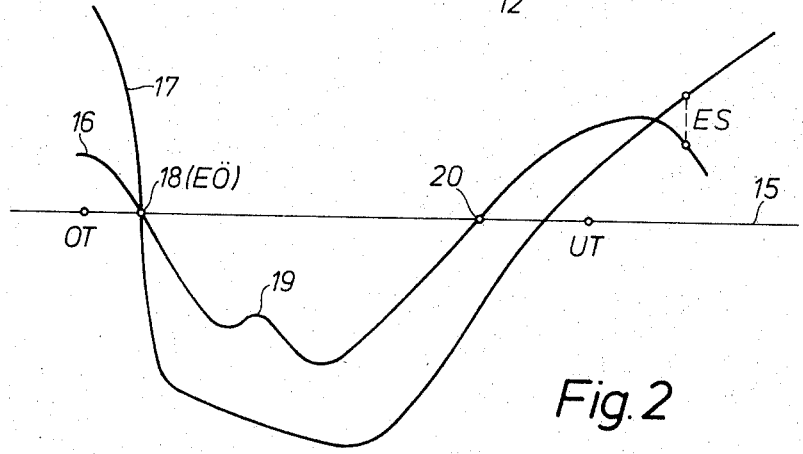
FIG. 2 shows the variation of the pressure during the induction period in the cylinder and the induction system according to the invention.

In the graph shown in FIG. 2, the zero line between negative pressures and positive pressures is designated 15. The curve plotting the pressure in the induction system during the suction stroke is designated 16, and the curve plotting the pressure in one of the cylinders 1 to 6 during the same period is designated with the reference numeral 17. OT designates the top dead center, and UT designates the bottom dead center of the piston. As can be seen from FIG. 2, the two pressure curves 16 and 17 intersect shortly after top dead center at the point 18 on the zero line 15, which indicates pressure balance between the induction system and the cylinder. It is at point 18, which hereinafter in this specification is equivalent to EO (inlet opening), that the inlet valve is opened for the induction processs. As a result of the piston motion, a vacuum is created in the cylinder, which accelerates the air mass contained in the intake pipe 10. The pressure pulse designated 19, which occurs in the induction or intake system, is caused by the fact that the piston initially accelerates only the air column existing in the branch 8, because the air column in the common intake pipe 10 is still in motion due to the preceding suction action of another cylinder.

Because of the accelerated air masses in the induction system 8, 10, the zero line 15 is passed far ahead of the bottom dead center at point 20 so that a pressure gradient arises. The positive pressure in the induction system also produces a positive pressure in the respective cylinder already before bottom dead center whereby filling of the cylinder is substantially improved by the time the inlet valve closes at ES.

Figure 3:
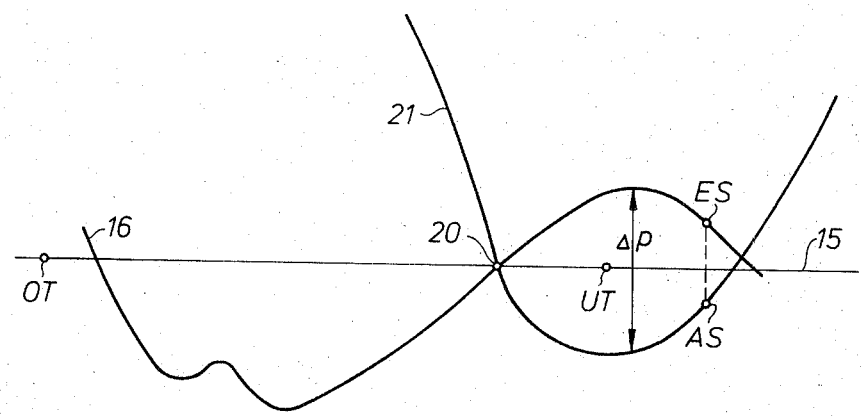
FIG. 3 shows the variations of the pressures in the induction and exhaust systems during the suction stroke.

FIG. 3 shows the pressure variations in the induction or intake system and in the exhaust systems during the valve overlap at the end of the suction stroke according to the invention, from which the desired effect can be clearly seen. The curve 16 for the pressure in the induction system corresponds to that in FIG. 2; the curve 21 indicates the variation of the pressure in the exhaust system. It is assumed in the embodiment illustrated that each common exhaust pipe 13 is so proportioned that no reflections or gas pressure pulsations from another cylinder affect the negative pressure in the exhaust system during the period in which the pressure in the induction system becomes positive due to the momentum of the air in the induction system of an associated cylinder up to the point at which the inlet valve closes. At the point 20, where the pressure in the induction system becomes positive, a negative pressure develops in the exhaust system. This is the time when the exhaust valve is opened for the scavenging action. The pressure differential, which this causes to develop between the inlet valve and the exhaust valve and which increases up to a certain level, brings about a further increase in the velocity and, consequently, swirl of the intake air in line with what is desired according to the invention. The inlet valve is finally closed together with the exhaust valve after bottom dead center, when the pressure gradient between the induction and exhaust systems is decreasing, but pressure balance does not yet exist. It may also be mentioned that the rising pressure in the induction system and the falling pressure in the exhaust system need not necessarily intersect at point 20 on the zero line 15. This intersection may also be at a point below the zero line 15, in which case the exhaust valve would be opened at this point.

Figure 4:
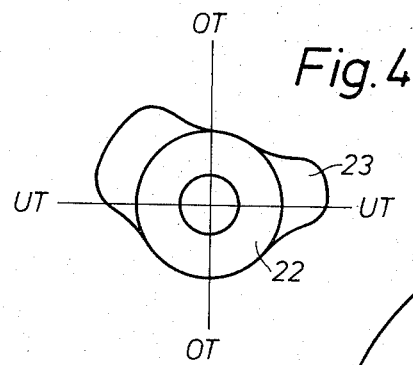
FIG. 4 illustrates a cam for actuating the exhaust valve according to the timing pattern proposed by the invention.

FIG. 4 shows a cam 22 for actuating the exhaust valve. It differs from the known cam primarily by the existence of a second lobe 23, which causes a valve overlap at the end of the induction period, in which connection it should be borne in mind that the camshaft performs only one rotation for every two rotations of the crankshaft in the embodiment shown.

Figure 5:
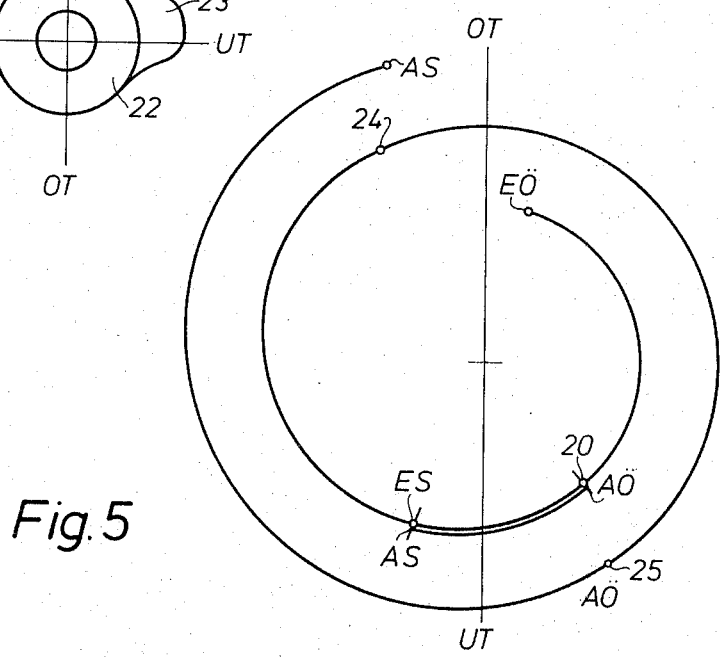
FIG. 5 is a timing diagram for a four-stroke internal-combustion engine according to the invention.

FIG. 5 is intended to show clearly the closing and opening of the inlet and exhaust valves as defined in this invention. At EO, about 20° crank angle after top dead center, the inlet valve opens for the suction stroke. At 20, there is pressure balance between the induction system and the exhaust system, the exhaust valve is opened additionally, which takes place at AO. Approximately 20°- 40° crank angle after bottom dead center, after which the pressure gradient between the inlet and exhaust systems decreases as previously mentioned, the inlet valve and the exhaust valve are closed simultaneously at ES and AS respectively. Then compression takes place up to point 24 and, subsequently, the power stroke up to 25. At 25, opening of the exhaust valve AO takes place to expel the burnt gases. Exhaust opening ends approximately at 20°- 30° crank angle before top dead center at AS (exhaust closure), so that both valves are closed at top dead center.

The degrees assumed in the example for the crank angles at which the individual events start and end respectively are by no means binding and may be changed depending on conditions. In particular, the valve overlap may be changed, or advanced respectively, relative to the bottom dead center.

Reverting to FIG. 1, it may be mentioned that automatically or manually operated throttling means 26 (FIG. 1) can be provided at the downstream end of each intake pipe 10 to reduce the air supply and, consequently, to reduce the swirl for the cylinders 1 – 6 in the idling range. Alternately, the throttling means 26 may be arranged directly upstream of the swirl port 7 of each of the cylinders 1 – 6. This feature will take effect only in the idling range of the engine.

It is, of course, to be understood that the present invention is, by no means, limited to the specific method set forth above but also comprises any modifications within the scope of the appended claims.

What I claim is:

1. A method for controlling the swirling air layers in the cylinder and combustion chamber of an air-compressing multi-cylinder reciprocating internal combustion engine having a combustion chamber in the shape of a body of revolution provided in each piston and means associated with each intake valve to induce a swirling motion of inducted air in the cylinder; said engine also having an induction system composed of connected groups of two or more individual cylinder intake pipes whose intake strokes do not overlap with the said connected groups being themselves connected to a single common intake, the said induction system being so proportioned that the pressure prevailing at the individual intake valves is at a sub-atmospheric level during the first of the intake stroke but rises to a pressure above atmospheric shortly before the end of the intake stroke and thus acting as a positive pressure on the cylinder, the method of operation including the steps of (1) opening the inlet valve on the inlet stroke only after the closure of the exhaust valve and after the pressure in the associated cylinder is equal to the pressure in the associated intake pipe (2) building an increased pressure differential across the engine cylinder shortly before the end of the intake stroke by the positive pressure produced by the induction system (3) reopening the exhaust valve shortly before the end of the intake stroke upon development of said pressure differential and (4) closing the exhaust valve at the same time the intake valve is closed at the end of the intake stroke.

2. A method for controlling the swirling air layers in the cylinder and combustion chamber as in claim 1, characterized in that the pressure differential between the inlet and exhaust passages is enlargeable by joining together the exhaust passages of interacting cylinders in a known manner to a common exhaust pipe connected to an equalizing chamber.

3. A method according to claim 2, characterized in that interaction of cylinders is achieved by ejector action taking place in the exhaust system.

4. A method according to claim 3, characterized in that the exhaust passages of groups of three cylinders having a firing interval of 240° crank angle are joined together to a common exhaust pipe.

5. A method according to claim 4, characterized in that the common exhaust pipe for each group of three cylinders is so proportioned that, during the period within which an exhaust valve is opened together with an inlet valve belonging to the same cylinder, a negative pressure is produced in the exhaust system, and that during this period no reflections or gas pressure pulsations of another cylinder affect this negative pressure.

6. A method according to claim 1, characterized in that the length of the common intake pipe for each group of at least three cylinders is so proportioned that the total accelerated air mass changes to a positive pressure at the time the exhaust valve is reopened at all speeds including maximum speed.

7. A method according to claim 6, characterized in that the diameter-to-length ratio of the common intake pipe is between 1:8 and 1:10.

8. A method according to claim 1, characterized in that at top dead center, which is exactly scavenging dead center, of the piston both the inlet valve and the exhaust valve are closed.

9. A method according to claim 8, characterized in that the inlet and exhaust valves are not provided with any valve recesses that are liable to affect the swirling velocity of the air.

10. A method according to claim 1, characterized in that throttling means, which are known as shown, are provided in the induction system to be effective in the idling range of the engine to prevent a high-speed air swirl and excessive air in the cylinder and to permit swirl-free reflux of the exhaust gases into the cylinder while the inlet and exhaust valves are overlapping at the end of the suction stroke.

* * * * *